(12) United States Patent
Cherng et al.

(10) Patent No.: US 10,446,826 B2
(45) Date of Patent: Oct. 15, 2019

(54) METHOD FOR MAKING LITHIUM IONIC ENERGY STORAGE ELEMENT

(71) Applicant: AMITA TECHNOLOGIES INC LTD., Taoyuan (TW)

(72) Inventors: Jing-Yih Cherng, Taoyuan (TW);
Bing-Joe Hwang, Taoyuan (TW);
Hsuan-Fu Wang, Taoyuan (TW);
Wei-Nien Su, Taoyuan (TW);
Chao-Yen Kuo, Taoyuan (TW)

(73) Assignee: AMITA TECHNOLOGIES INC LTD., Taoyuan County (TW)

( * ) Notice: Subject to any disclaimer, the term of this patent is extended or adjusted under 35 U.S.C. 154(b) by 0 days.

(21) Appl. No.: 16/136,181

(22) Filed: Sep. 19, 2018

(65) Prior Publication Data

US 2019/0020014 A1 Jan. 17, 2019

Related U.S. Application Data

(62) Division of application No. 14/798,004, filed on Jul. 13, 2015, now abandoned.

(30) Foreign Application Priority Data

Nov. 4, 2014 (TW) .............................. 103138190 A

(51) Int. Cl.
*H01M 4/04* (2006.01)
*H01M 4/1395* (2010.01)
(Continued)

(52) U.S. Cl.
CPC ......... *H01M 4/0471* (2013.01); *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/386* (2013.01); *H01M 4/485* (2013.01);
(Continued)

(58) Field of Classification Search
CPC .. H01M 4/0404; H01M 4/0471; H01M 4/131; H01M 4/133; H01M 4/134; H01M 4/1391; H01M 4/1393; H01M 4/1395; H01M 4/386; H01M 4/485; H01M 4/5815;
(Continued)

(56) References Cited

U.S. PATENT DOCUMENTS

| | | | | |
|---|---|---|---|---|
| 2005/0106460 | A1* | 5/2005 | Otsuki | H01M 4/04 429/224 |
| 2014/0178748 | A1* | 6/2014 | Chernyshov | C08K 3/22 429/188 |
| 2014/0255794 | A1* | 9/2014 | Zhang | H01M 4/364 429/337 |

* cited by examiner

*Primary Examiner* — Brittany L Raymond
(74) *Attorney, Agent, or Firm* — Chun-Ming Shih; HDLS IPR Services

(57) ABSTRACT

A method for making a lithium ionic energy storage element, the method includes the steps of: (a) mixing a lithium ion donor, a positive electrode frame active substance and a binder with a predetermined weight ratio to form a mixture, and adding the mixture into a dispersant to form a positive electrode active substance, wherein the lithium ion donor includes lithium peroxide, lithium oxide or a combination thereof; (b) coating the positive electrode active substance on an aluminum foil to form a film, and baking the film to form a positive electrode; and (c) forming a lithium ionic energy storage element by assembling the positive electrode, a negative electrode having a negative electrode active substance and a porous separate strip interposed between the (Continued)

positive electrode and the negative electrode, and filling an electrolyte into the porous separate strip.

9 Claims, 15 Drawing Sheets

(51) Int. Cl.
*H01M 4/505* (2010.01)
*H01M 4/1391* (2010.01)
*H01M 4/38* (2006.01)
*H01M 4/587* (2010.01)
*H01M 4/485* (2010.01)
*H01M 4/131* (2010.01)
*H01M 4/134* (2010.01)
*H01M 4/133* (2010.01)
*H01M 4/583* (2010.01)
*H01M 4/58* (2010.01)
*H01M 4/525* (2010.01)
*H01M 4/1393* (2010.01)
*H01M 10/0525* (2010.01)

(52) U.S. Cl.
CPC ........... *H01M 4/505* (2013.01); *H01M 4/525* (2013.01); *H01M 4/587* (2013.01); *H01M 4/5815* (2013.01); *H01M 4/5835* (2013.01); *H01M 10/0525* (2013.01)

(58) Field of Classification Search
CPC ............... H01M 4/5835; H01M 4/587; H01M 10/0525; H01M 2300/0037
See application file for complete search history.

METHOD FOR MAKING LITHIUM IONIC ENERGY STORAGE ELEMENT

CROSS-REFERENCE TO RELATED APPLICATIONS

This application is a divisional application of U.S. patent application Ser. No. 14/798,004, filed on Jul. 13, 2015, and entitled "LITHIUM IONIC ENERGY STORAGE ELEMENT AND METHOD FOR MAKING THE SAME", which claims priority to TW103138190 filed Nov. 4, 2014. The entire disclosures of the above application are all incorporated herein by reference.

BACKGROUND

Technical Field

The present disclosure relates to a method for making a lithium ionic energy storage element, in particular to a method for making a lithium ionic energy storage element including a positive electrode active substance having a lithium ion donor and a positive electrode frame active substance.

Description of Related Art

The statements in this section merely provide background information related to the present disclosure and do not necessarily constitute prior art.

In various energy storage technologies, lithium ionic batteries are regarded as a portable chemical power source with a high efficiency in next generation because they have advantages of high energy density, light weight and less pollution. Nowadays, the lithium ionic batteries are widely used in the fields of digital cameras, smart phones and notebooks. As the energy density of the lithium ionic battery is enhanced, the fields of use are extended. There is a higher need for the performance of the lithium ionic battery as the requirement of high capacity and long life of the lithium ionic battery for the mobile electric equipment is increased.

Typically, a lithium ionic battery includes a negative electrode, a positive electrode and an electrolyte. The positive electrode active substance is not only used as an electrode material to take part in the chemical reaction, but also used as a lithium source. The positive electrode active substance is generally lithium metallic oxides which contain lithium atoms intercalated therein. Currently, lithium metallic oxides such as lithium cobalt oxide, lithium nickel oxide and lithium manganese oxide are available commercially. However, the above lithium metallic oxides cannot exhibit a proper combinative property of high initial electrical capacity, high thermal stability and excellent electrical capacity sustainability after a lithium ionic battery is charged and discharged repeatedly.

The lithium ionic battery is limited by the capacity (mA/g) of the positive electrode of the lithium metallic oxides, so that it cannot exhibit a higher capacity. Therefore, the lithium sources have to be increased if it is desired to increase the capacity of the lithium ionic battery. Several methods were proposed, wherein one of the methods is coating lithium metal used as lithium source on the negative electrode, and another method is forming lithium metal as a third electrode on the negative electrode by electroplating. However, the above two methods are difficult to perform and the coating and electroplating film are not uniform because the lithium metal is very active.

Because lithium metal has disadvantages of safety and stability, the current commercial lithium ion secondary battery is used a working system having a positive electrode material containing lithium ions and a negative electrode material for intercalating lithium ions. In recent years, the energy density of the lithium ion secondary battery has to be enhanced, because the electric devices have a large energy demand. However, the stability of the positive electrode material structure is not high and the amount of lithium ions intercalation is not large, so that the capacity per gram cannot be further enhanced.

Several materials, for example $FeF_3$, $FePO_4$ and $V_2O_5$ were proposed. The above materials are preferable to be the positive electrode material for a high energy density, because they have good electrical capacity and a higher platform voltage. However, the above materials do not contain lithium ions, so they have to combine with lithium metal. As a result, they would be only used in half cell tests but fail to be used in a full cell.

Therefore, the inventor conducted researches according to the scientific approach in order to improve and resolve the above drawback, and finally proposed the present disclosure, which is reasonable and effective.

SUMMARY

It is an object of present disclosure to provide a method for making a lithium ionic energy storage element. It can exhibit a high capacity by using a positive electrode active substance which has a lithium ion donor and a positive electrode frame active substance.

In order to achieve the above object, the method includes the steps of: (a) mixing a lithium ion donor, a positive electrode frame active substance and a binder with a predetermined weight ratio to form a mixture, and adding the mixture into a dispersant to form a positive electrode active substance, wherein the lithium ion donor includes lithium peroxide, lithium oxide or a combination thereof; (b) coating the positive electrode active substance on an aluminum foil to form a film, and baking the film to form a positive electrode; and (c) forming a lithium ionic energy storage element by assembling the positive electrode, a negative electrode having a negative electrode active substance and a porous separate strip interposed between the positive electrode and the negative electrode, and filling an electrolyte into the porous separate strip.

At first, lithium peroxide, a positive electrode frame active substance, e.g. anatase titanium dioxide and a binder, e.g. PVDF are mixed with a predetermined weight ratio to form a mixture, and the mixture is added into a dispersant, e.g. N-methyl-2-pyrrolidone to form a slurry. Next, the slurry is coating on an aluminum foil to form a film by a blade coater. The film is baked in an oven at a temperature of 80-90° C. to remove a solvent, and raise the temperature to 120-130° C. for a period of time to form a positive electrode with lithium peroxide/anatase titanium dioxide. In order to increase conductivity of lithium peroxide, conductive carbon, for example super P carbon black, KS6 graphite or a combination thereof may be added.

A lithium ionic energy storage element is formed by assembling the positive electrode with lithium peroxide/anatase titanium dioxide, a negative electrode having a negative electrode active substance, e.g. graphitized mesocarbon microbeads (MCMB) and a porous separate strip interposed between the positive electrode and the negative electrode, and an electrolyte, e.g. a concentration of 1M $LiPF_6$ dissolving in a mixing solution of ethylene carbonate (EC) and diethyl carbonate (DEC) with mixing ratio 1:1 by volume is filled into the porous separate strip.

Further, the present disclosure relates to a method for making a lithium ionic energy storage element. At first, lithium peroxide, a positive electrode frame active substance, e.g. carbon-sulfur composite and a binder, e.g. carboxymethyl cellulose (CMC) are mixed with a predetermined weight ratio to form a mixture, and the mixture is added into a dispersant, e.g. N-methyl-2-pyrrolidone to form a slurry. Next, the slurry is coating on an aluminum foil to form a film by a blade coater. The film is baked in an oven at a temperature of 80-90° C. to remove a solvent, and raise the temperature to 120-130° C. for a period of time to form a positive electrode with lithium peroxide/carbon-sulfur composite. In order to increase conductivity of lithium peroxide, conductive carbon, for example super P carbon black, KS6 graphite or a combination thereof may be added.

A lithium ionic energy storage element is formed by assembling the positive electrode with lithium peroxide/carbon-sulfur composite, a negative electrode having a negative electrode active substance, e.g. hard carbon and a porous separate strip interposed between the positive electrode and the negative electrode, and an electrolyte, e.g. a concentration of 1M lithium bis(trifluoromethanesulfonly) imide dissolving in a mixing solution of tetraethylene glycol dimethyl ether (TEGDME) and 1,3-dioxolane (DOL) with mixing ratio 1:1 by volume is filled into the porous separate strip.

Compared to the conventional lithium ionic battery including lithium metallic oxides, the lithium ionic energy storage element of the present disclosure includes a lithium ion donor having lithium peroxide and/or lithium oxide and a positive electrode frame active substance, wherein lithium peroxide and/or lithium oxide can be decomposed to produce lithium ions by electrochemical charging, and lithium ions intercalate repeatedly in and out of the positive electrode frame active substance and the negative electrode active substance in a full cell. The full cell can exhibit a high capacity.

BRIEF DESCRIPTION OF THE DRAWINGS

The present disclosure can be more fully understood by reading the following detailed description of the embodiment, with reference made to the accompanying drawings as follows.

DETAILED DESCRIPTION

The technical content of present disclosure will be explained in more detail below with reference to a few figures. However, the figures are intended solely for illustration and not to limit the inventive concept.

Figure 1:
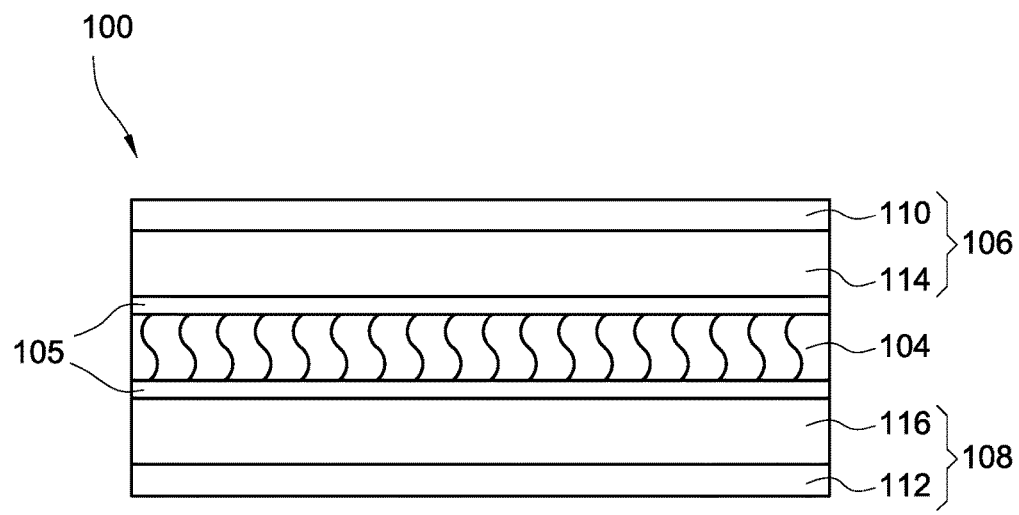
FIG. 1 shows a schematic view of a unit cell structure of a lithium ionic energy storage element an embodiment according to the present disclosure.

FIG. 1 shows a schematic view of a unit cell structure of a lithium ionic energy storage element an embodiment according to the present disclosure. In the embodiment, the lithium ionic energy storage element includes a plurality of unit cell structures 100, each unit cell structure 100 includes a porous separate strip 104 interposed between the positive electrode 106 and the negative electrode 108. The porous separate strip 104 is coated with a binder 105 to enhance the binding of the cell structure's 100 components to each other. The positive electrode 106 has a first current collector 110 and a positive electrode active substance 114 provided on the first current collector 110 and the negative electrode 108 has a second current collector 112 and a negative electrode active substance 116 provided on the second current collector 112. The positive electrode active substance 114 includes a lithium ion donor including lithium peroxide, lithium oxide or a combination thereof and a positive electrode frame active substance, e.g. anatase titanium dioxide or carbon-sulfur composite. The carbon-sulfur composite has a weight ratio of carbon with sulfur is 0.4-1. In lithium peroxide/anatase titanium dioxide system, the negative electrode active substance 116 may be carbon-containing materials, e.g. graphitized mesocarbon microbeads (MCMB). In lithium peroxide/carbon-sulfur composite system, the negative electrode active substance 116 may be carbon-containing materials, e.g. hard carbon.

In the embodiment, the positive electrode active substance 114 used in a lithium ionic energy storage element, the positive electrode active substance 114 including a lithium ion donor and a positive electrode frame active substance, wherein the lithium ion donor includes lithium peroxide, lithium oxide or a combination of lithium peroxide and lithium oxide; and the positive electrode frame active substance is a material selected from the group consisting of anatase titanium dioxide, carbon-sulfur composite, carbon-containing materials and carbon fluoride or is lithium metallic oxides.

The lithium ion donor of the present disclosure may include but not be limited to lithium peroxide. For example, lithium oxide is also suitable to be the lithium ion donor. Alternative, lithium peroxide and lithium oxide are mixed for the use. In addition, the positive electrode frame active substance may use carbon-containing material, and thus both of the positive electrode and negative electrode use carbon-containing materials to form lithium ion electric capacity accordingly. Carbon fluorides ($CF_x$) that have a high mass capacity ratio are suitable to be the positive electrode frame active substance of the present disclosure. Si alloy or Sn alloy that has a very high theoretical electrical capacity is also suitable to be negative electrode active substance 116 of the present disclosure.

An electrolyte that is suitable to a lithium ionic energy storage element with lithium peroxide/anatase titanium dioxide system includes an inorganic compound such as $LiPF_6$, $LiClO_4$ or $LiBF_4$ and an organic solvent that is a material selected from the group consisting of ethylene carbonate (EC) and diethyl carbonate (DEC). In addition, an electrolyte includes a concentration of 1M lithium bis(trifluoromethanesulfonly)imide dissolving in a mixing solution of tetraethylene glycol dimethyl ether (EGDME) and 1,3-dioxolane (DOL) with mixing ratio 1:1 by volume that is suitable to a lithium ionic energy storage element with lithium peroxide/carbon-sulfur system.

In a charge/discharge mode of the unit cell structure 100 of the embodiment, lithium peroxide of the positive electrode active substance 114 is decomposed to lithium ions and oxygen to intercalate into carbon-containing materials of the negative electrode 108 when unit cell is charged, and the lithium ions located in the negative electrode 108 diffuse to the positive electrode 106 and intercalate in the positive electrode active substance through the electrolyte when unit cell is discharged.

At first, electric property of lithium peroxide is investigated. The lithium ionic energy storage element of the present disclosure includes a lithium ion donor having lithium peroxide and/or lithium oxide and a positive electrode frame active substance, wherein lithium peroxide and/or lithium oxide can be decomposed to produce lithium ions by electrochemical charging, and lithium ions intercalate repeatedly in and out of the positive electrode frame active substance and the negative electrode active substance in a full cell without containing Li ions. Because the conductivity of lithium peroxide is not high, a conductive carbon may be added to enhance the conductivity of lithium peroxide.

The present disclosure provides a method for making a lithium ionic energy storage element. At first, lithium peroxide, a positive electrode frame active substance, e.g. anatase titanium dioxide, a conductive carbon, for example super P carbon black, KS6 graphite or a combination thereof and a binder, e.g. PVDF are mixed with a predetermined weight ratio to form a mixture, and the mixture is added into a dispersant, e.g. N-methyl-2-pyrrolidone (NMP) to form a slurry. Next, the slurry is coating on an aluminum foil to form a film by a blade coater. The film is baked in an oven at a temperature of 80° C. for 6 hours to remove a solvent, and raise the temperature to 120° C. for 4-6 hours to form a positive electrode with lithium peroxide/anatase titanium dioxide.

A lithium ionic energy storage element is formed by assembling the positive electrode with lithium peroxide/anatase titanium dioxide, a negative electrode having a negative electrode active substance, e.g. graphitized mesocarbon microbeads (MCMB) and a porous separate strip interposed between the positive electrode and the negative electrode, and an electrolyte, e.g. a concentration of 1M $LiPF_6$ dissolving in a mixing solution of ethylene carbonate (EC) and diethyl carbonate (DEC) with mixing ratio 1:1 by volume is filled into the porous separate strip. The lithium ion donor of the present disclosure may include but not be limited to lithium peroxide. For example, lithium oxide is also suitable to be the lithium ion donor. Alternative, lithium peroxide and lithium oxide are mixed for the use. In addition, the positive electrode frame active substance may use carbon-containing material, and thus both of the positive electrode and negative electrode use carbon-containing materials to form a lithium ion electric capacity accordingly. Carbon fluorides (CFx) that have a high mass capacity ratio are suitable to be the positive electrode frame active substance of the present disclosure. Si alloy or Sn alloy that has a very high theoretical electrical capacity is also suitable to be negative electrode active substance 116 of the present disclosure.

Further, the present disclosure relates to a method for making a lithium ionic energy storage element. At first, lithium peroxide, a positive electrode frame active substance, e.g. carbon-sulfur composite, a conductive carbon, for example super P carbon black, KS6 graphite or a combination thereof and a binder, e.g. carboxymethyl cellulose (CMC) are mixed with a predetermined weight ratio to form a mixture, and the mixture is added into a dispersant, e.g. N-methyl-2-pyrrolidone to form a slurry. Next, the slurry is coating on an aluminum foil to form a film by a blade coater. The film is baked in an oven at a temperature of 80-90° C. to remove a solvent, and raise the temperature to 120-130° C. for a period of time to form a positive electrode with lithium peroxide/carbon-sulfur composite.

The lithium ion donor of the present disclosure may include but not be limited to lithium peroxide. For example, lithium oxide is also suitable to be the lithium ion donor. Alternative, lithium peroxide and lithium oxide are mixed for the use. In addition, the positive electrode frame active substance may use carbon-containing material, and thus both of the positive electrode and negative electrode use carbon-containing materials to form a lithium ion electric capacity accordingly. Carbon fluorides (CFx) that have a high mass capacity ratio are suitable to be the positive electrode frame active substance of the present disclosure. Si alloy or Sn alloy that has a very high theoretical electrical capacity is also suitable to be negative electrode active substance 116 of the present disclosure.

A lithium ionic energy storage element is formed by assembling the positive electrode with lithium peroxide/carbon-sulfur composite, a negative electrode having a negative electrode active substance, e.g. hard carbon and a porous separate strip interposed between the positive electrode and the negative electrode, and an electrolyte, e.g. a concentration of 1M lithium bis(trifluoromethanesulfonly)imide dissolving in a mixing solution of tetraethylene glycol dimethyl ether (TEGDME) and 1,3-dioxolane (DOL) with mixing ratio 1:1 by volume is filled into the porous separate strip.

(Performance Determination)

Figure 2:
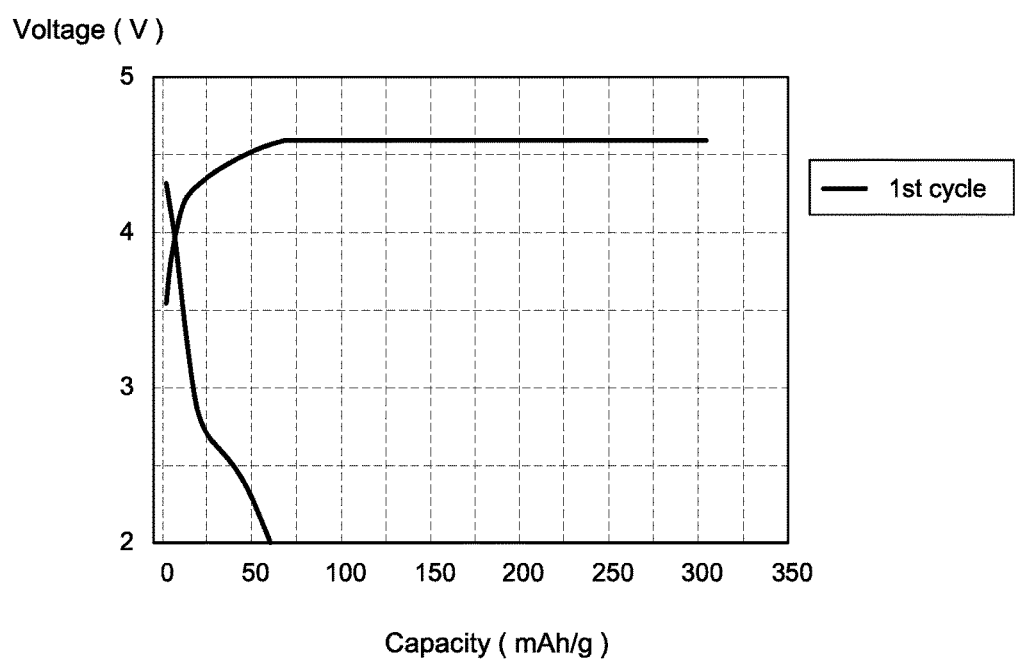
FIG. 2 shows a first cycle curve of voltage against electric capacity of a half cell of lithium peroxide charging/discharging of the present disclosure.
Figure 3:
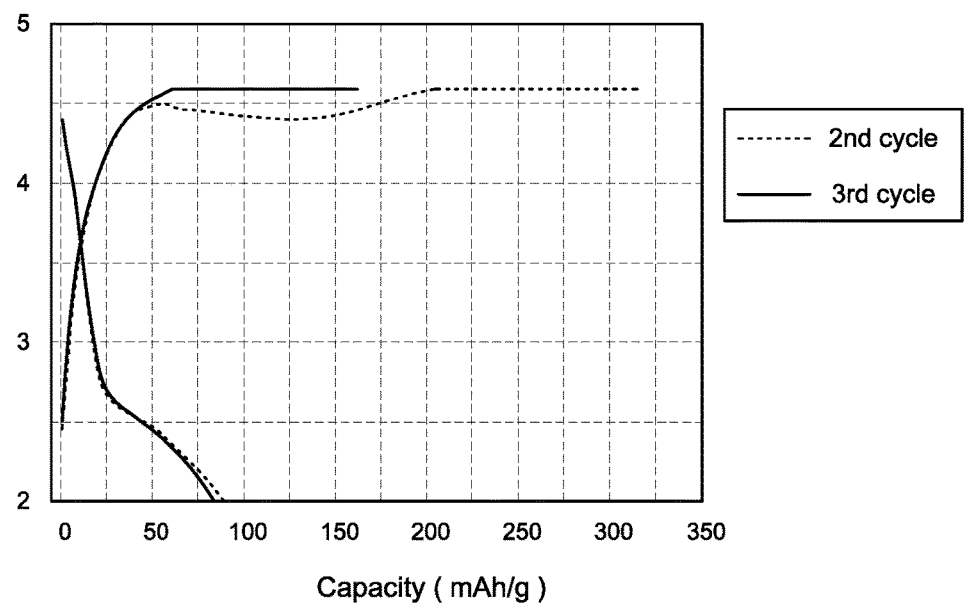
FIG. 3 shows a second cycle and a third cycle curves of voltage against electric capacity of a half cell of lithium peroxide charging/discharging of the present disclosure.

FIG. 2 shows a first cycle curve of voltage against electric capacity of a half cell of lithium peroxide charging/discharging of the present disclosure. FIG. 3 shows a second cycle and a third cycle curves of voltage against electric capacity of a half cell of lithium peroxide charging/discharging of the present disclosure. A half cell that is used for test is formed by assembling a positive electrode formed with mixing lithium peroxide, super P carbon black and PVDF by weight ratio of 10:80:10; and a porous separate strip filled with an electrolyte, e.g. a concentration of 1M $LiPF_6$ dissolving in a mixing solution of ethylene carbonate (EC) and diethyl carbonate (DEC) with mixing ratio 1:1 by volume. Conditions of operation include charging/discharging current of 100 mA/g $Li_2O_2$ and charging/discharging voltage of 2~4.6V.

Figure 4:
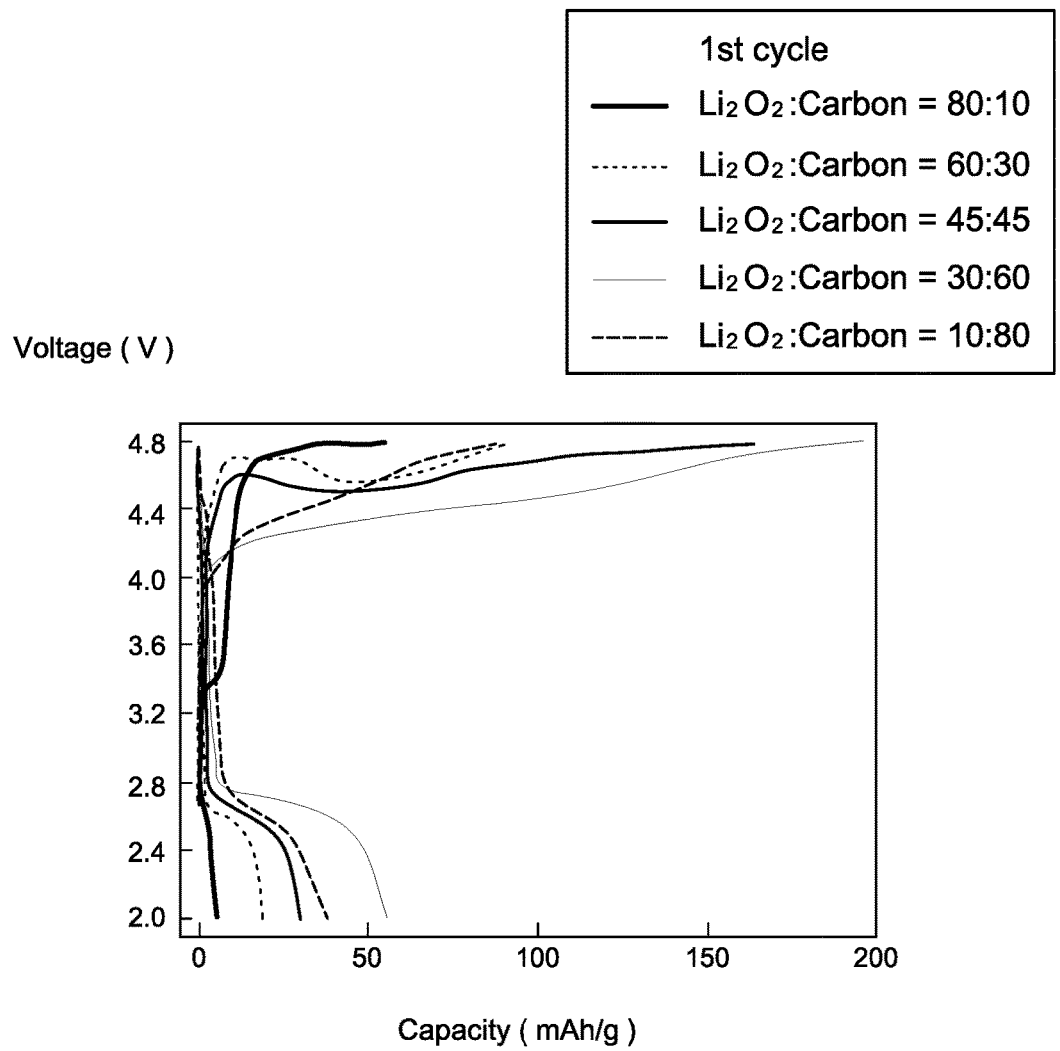
FIG. 4 shows a first cycle curve of voltage against electric capacity of a half cell of lithium peroxide charging/discharging under various ratio of a conductive carbon of the present disclosure.

FIG. 4 shows a first cycle curve of voltage against electric capacity of a half cell of lithium peroxide charging/discharging under various ratio of a conductive carbon of the present disclosure. A half cell that is used for test is formed by assembling a positive electrode formed with mixing lithium peroxide, a conductive carbon (super P carbon black and KS6 graphite with mixing ratio 1:1 by weight) and PVDF by weight ratio of X:Y:10, wherein X=80, 60, 45, 30 and 10, and Y=10, 30, 45, 60 and 80; and a porous separate strip filled with an electrolyte, e.g. a concentration of 1M $LiPF_6$ dissolving in a mixing solution of ethylene carbonate (EC) and diethyl carbonate (DEC) with mixing ratio 1:1 by volume. Conditions of operation include charging/discharging current of 10 $mA/g_{Li2O2}$ and charging/discharging voltage of 2-4.8V.

Figure 5:
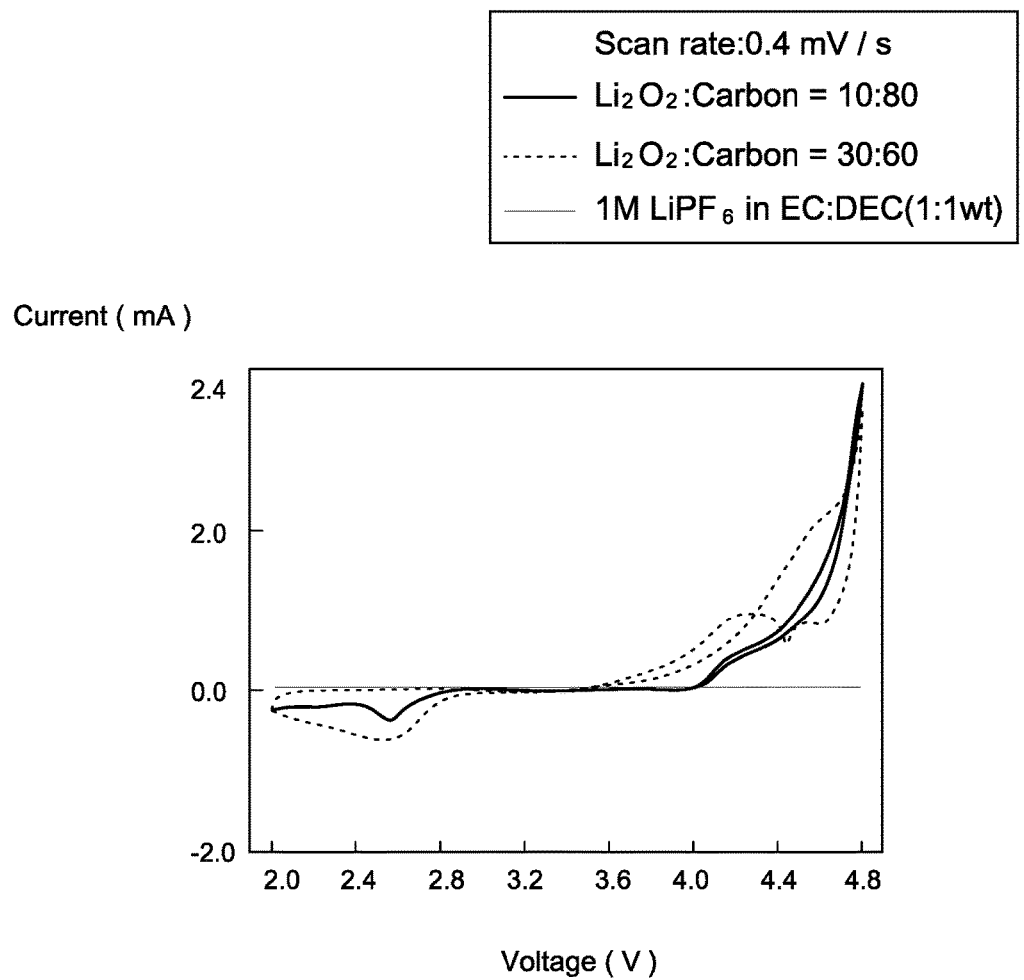
FIG. 5 shows cyclic voltammetry response of lithium peroxide charging/discharging under various ratio of a conductive carbon of the present disclosure.

FIG. 5 shows cyclic voltammetry response of lithium peroxide charging/discharging under various ratio of a conductive carbon of the present disclosure. A half cell that is used for test is formed by assembling a positive electrode formed with mixing lithium peroxide, a conductive carbon (super P carbon black and KS6 graphite with mixing ratio 1:1 by weight) and PVDF by weight ratio of X:Y:10, wherein X:Y=10:80 and 30:60; and a porous separate strip filled with an electrolyte, e.g. a concentration of 1M $LiPF_6$ dissolving in a mixing solution of ethylene carbonate (EC) and diethyl carbonate (DEC) with mixing ratio 1:1 by volume. Condition of operation includes a scan rate of cyclic voltammetry of 0.4 mV/s. The resultant current is 0 mA in the different voltage.

Figure 6:
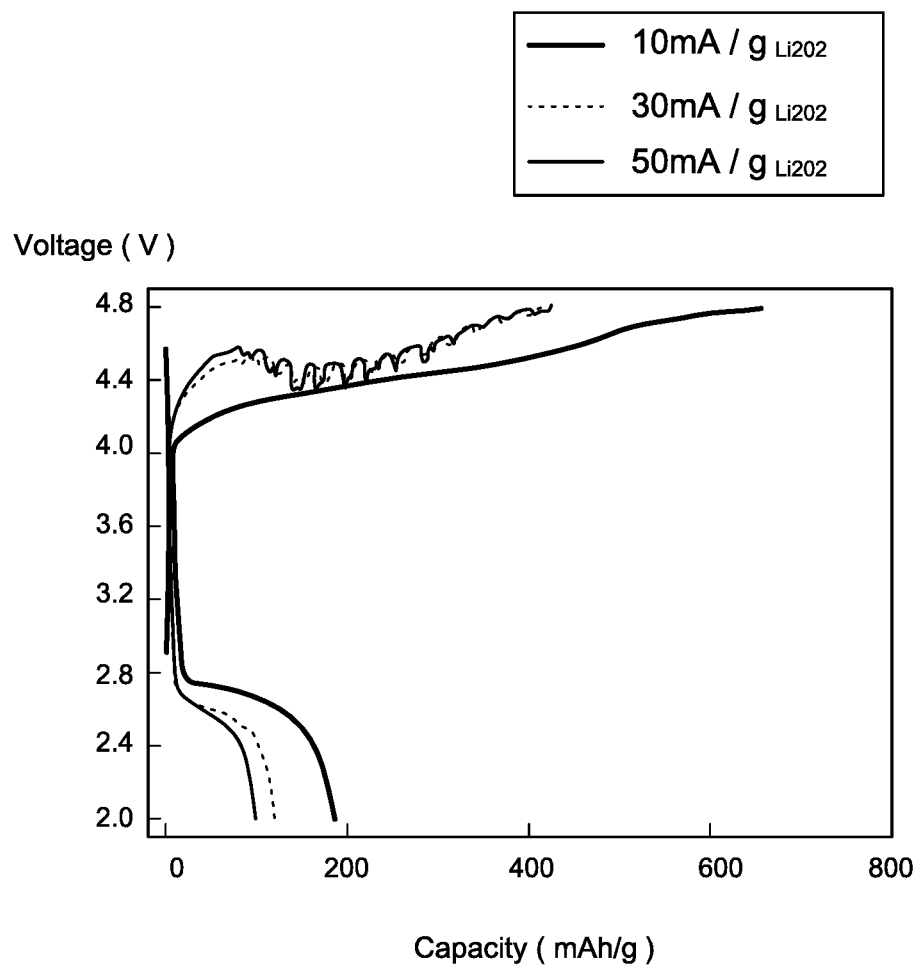
FIG. 6 shows the influent of voltage against electric capacity of lithium peroxide in the different current density.
Figure 7A:
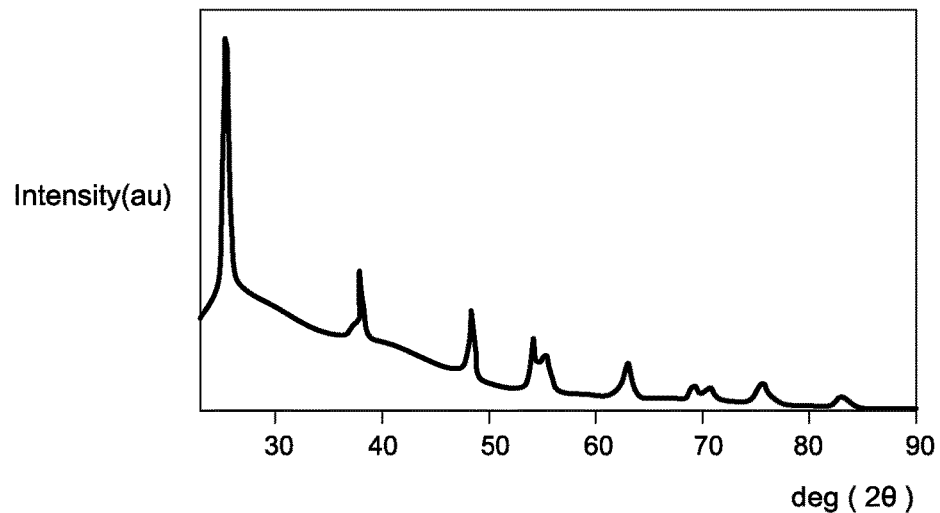
FIG. 7(a) shows XRD pattern of $TiO_2$ synthetized from tetrabutyl titanate of the present disclosure.
Figure 7B:
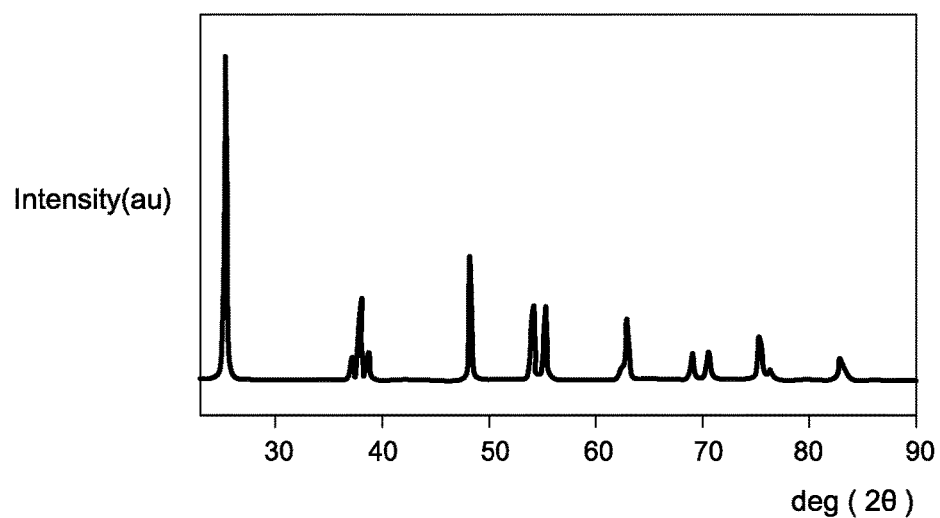
FIG. 7(b) shows XRD pattern of $TiO_2$ by simulation.

FIG. 6 shows the influent of voltage against electric capacity of lithium peroxide in the different current density. A half cell that is used for test is formed by assembling a positive electrode formed with mixing lithium peroxide, a conductive carbon (super P carbon black and KS6 graphite with mixing ratio 1:1 by weight) and PVDF by weight ratio of 30:60:10; and a porous separate strip filled with an electrolyte, e.g. a concentration of 1M LiPF6 dissolving in a mixing solution of ethylene carbonate (EC) and diethyl carbonate (DEC) with mixing ratio 1:1 by volume. Conditions of operation include charging/discharging current of 10 mA/g $Li_2O_2$, 30 mA/g $Li_2O_2$ and 50 mA/g $Li_2O_2$ and charging/discharging voltage of 2~4.8V. FIG. 7(a) shows XRD pattern of $TiO_2$ synthetized from tetrabutyl titanate of the present disclosure. FIG. 7(b) shows XRD pattern of $TiO_2$ by simulation. An error of degree (2θ) of XRD pattern of $TiO_2$ of FIG. 7(a) is obtained within 3% compared with XRD pattern of $TiO_2$ of FIG. 7(b).

The above tests show the various combinations of lithium peroxide, a conductive carbon and binder, and the influence of charging and discharging of lithium peroxide in the different current density. However, lithium peroxide of the positive electrode is a functional material for use in one time, i.e. only may be decomposed by charging in one time. Therefore, another positive electrode active substance, for example anatase titanium dioxide or carbon-sulfur composite is required to use for receiving Li ions that may diffuse to the positive electrode from the negative electrode in a discharging process.

The initial lithium peroxide may be decomposed to produce Li ions by charging of the present disclosure that is called as a charging period of prelithiation, and Li ions diffuse to the positive electrode from the negative electrode by discharging that is called as a discharging period of prelithiation. The subsequent Li ions intercalate in and out in the positive electrode and negative electrode that is called as a regular working system.

Figure 8:
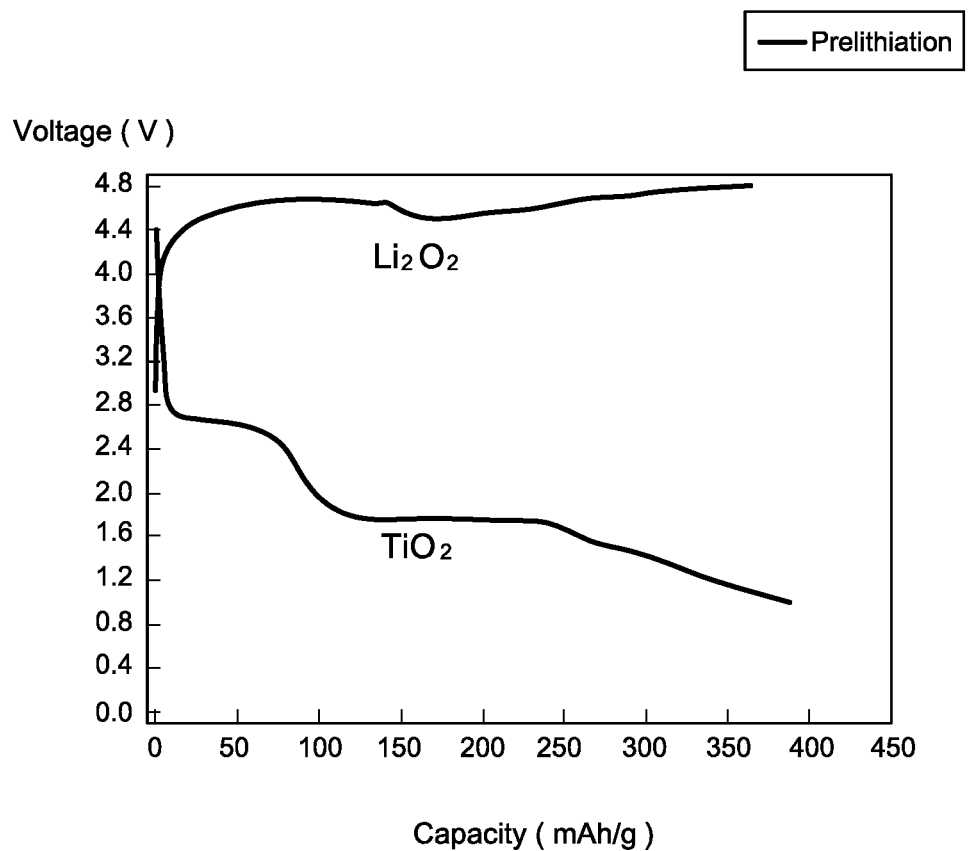
FIG. 8 shows a charging/discharging curve of prelithiation period of $Li_2O_2/TiO_2$ half cell.
Figure 9:
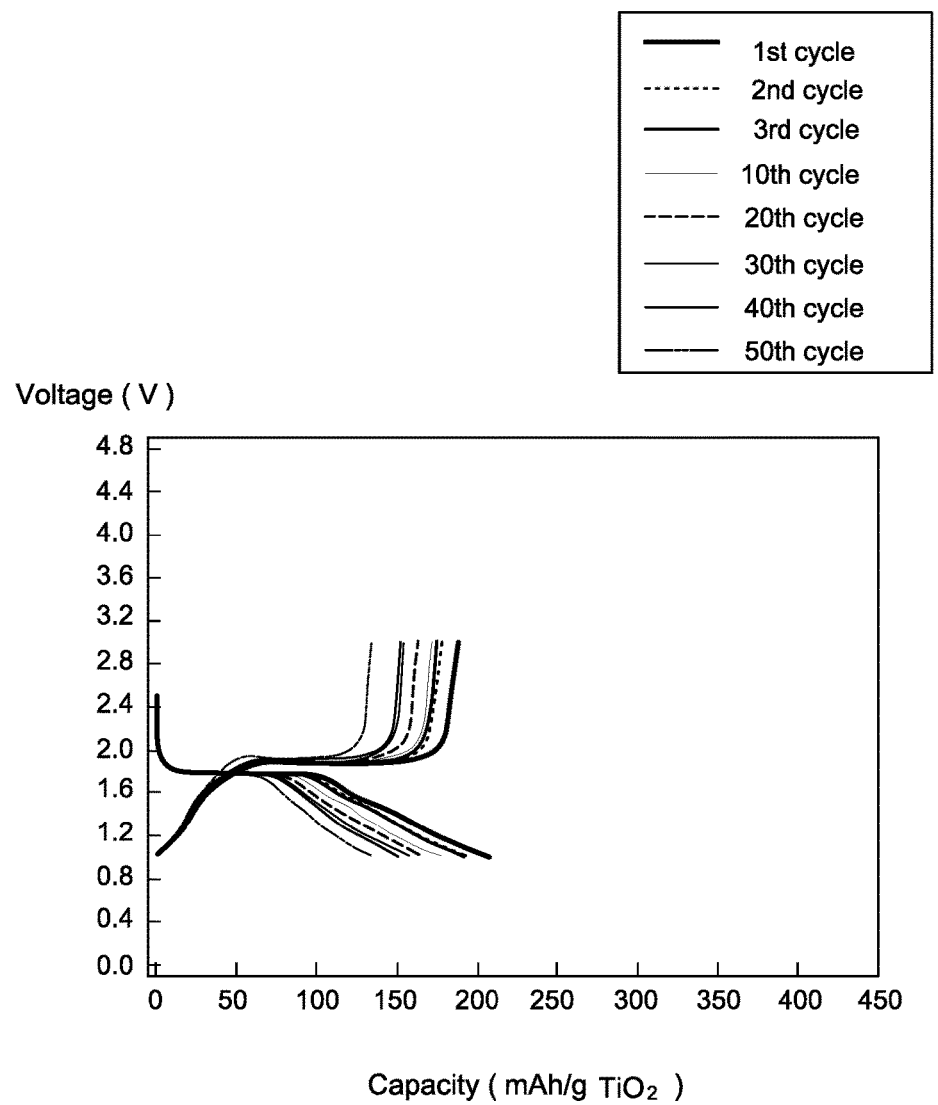
FIG. 9 shows a charging/discharging curve of subsequent cycles of $Li_2O_2/TiO_2$ half cell.

Please refer to FIG. 8 and FIG. 9. FIG. 8 shows a charging/discharging curve of prelithiation period of $Li_2O_2$/$TiO_2$ half cell. FIG. 9 shows a charging/discharging curve of subsequent cycles of $Li_2O_2$/$TiO_2$ half cell. During charging period of prelithiation, lithium peroxide may be charged to 4.8V against $Li/Li^+$ by applying the current density of 50 $mA/gLi_2O_2$. During discharging period of prelithiation and subsequent charging/discharging, $TiO_2$ may be charged and discharged at 1V-3V against $Li/Li^+$ by 0.1 C (1 C=335 mAh/g). The resultant charging/discharging curves of half cells are shown in FIG. 8 and FIG. 9. FIG. 8 shows a charging curve of $Li_2O_2$ with electric capacity of 365 $mAh/gLi_2O_2$ during charging period of prelithiation and a discharging curve of $TiO_2$ with two discharging platforms of 1.8V and 2.7V during discharging period of prelithiation, wherein the discharging platform of 2.7V has electric capacity of 100 $mAh/gTiO_2$ that may be an oxidation-reduction reaction or regeneration of lithium peroxide, and it is regarded as a side reaction, i.e. the additional electric capacity may not belong to $TiO_2$. Moreover, the resultant electric capacity may be about 280 $mAh/gTiO_2$ after 100 $mAh/gTiO_2$ of the electric capacity of the side reaction is deducted from 380 $mAh/gTiO_2$.

Figure 10:
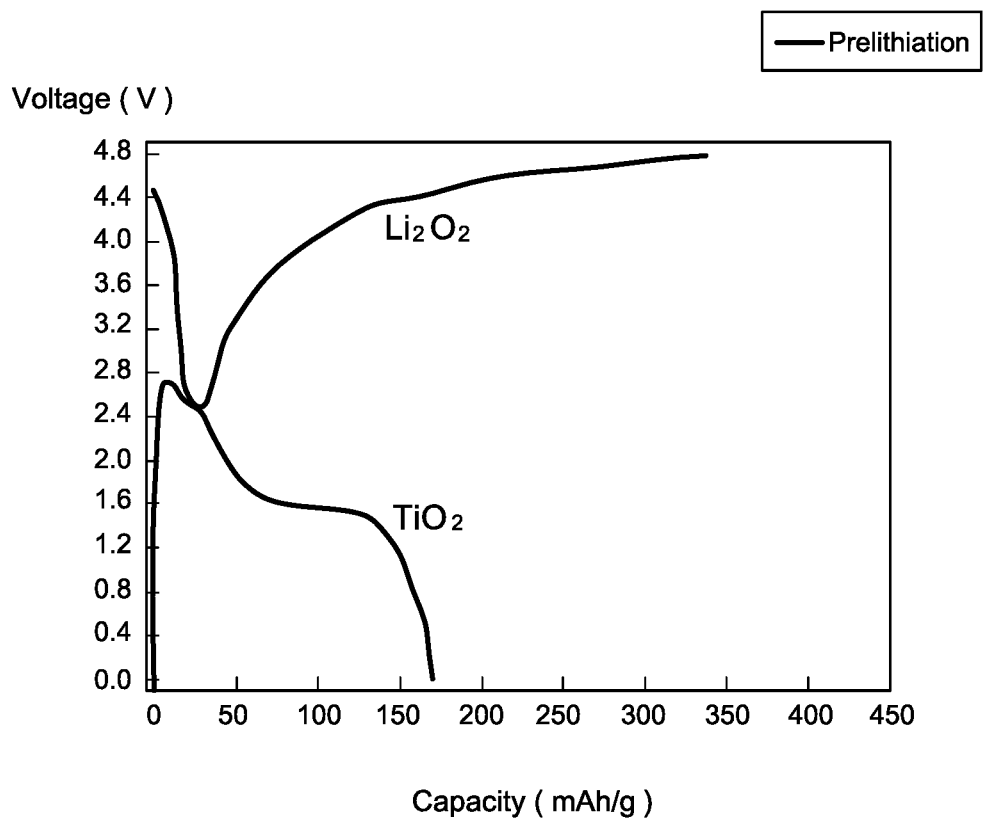
FIG. 10 shows a charging/discharging curve of prelithiation period of $Li_2O_2/TiO_2$ versus MCMB full cell.
Figure 11:
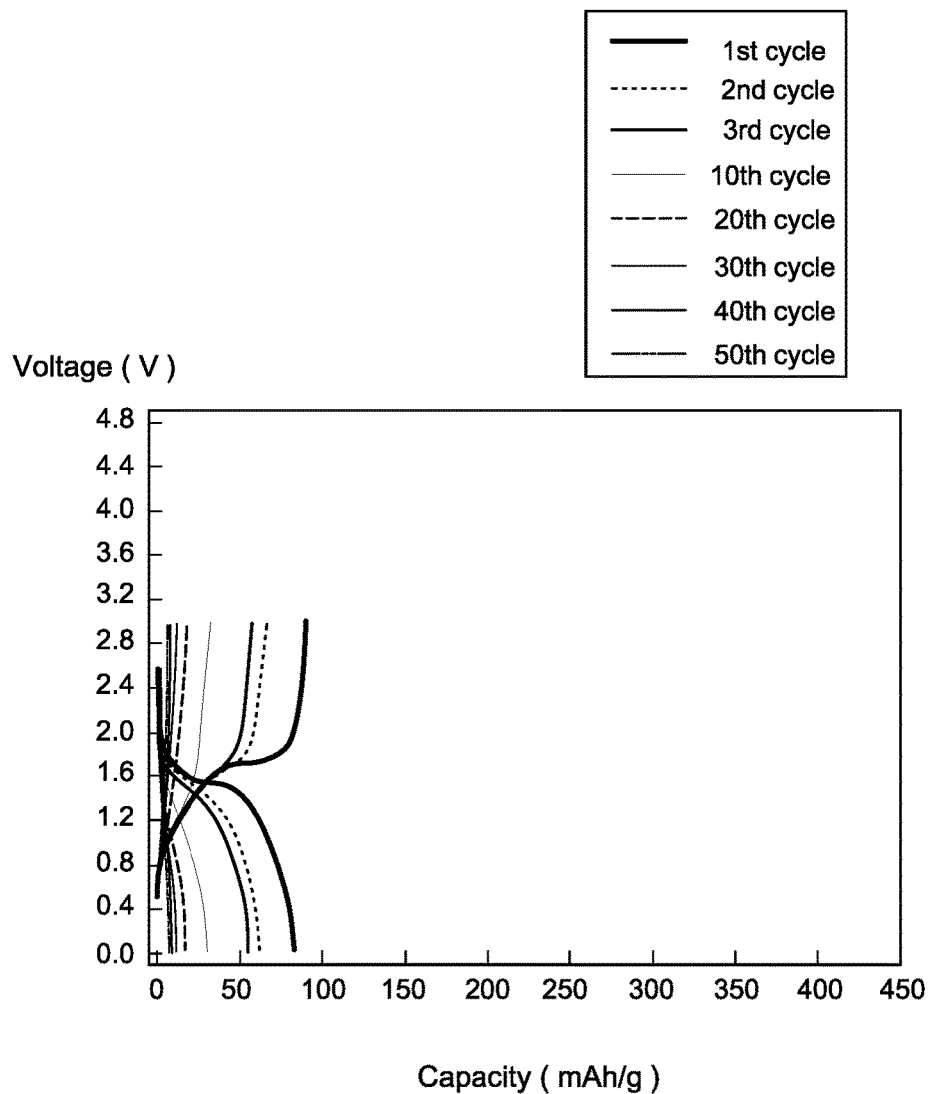
FIG. 11 shows a charging/discharging curve of subsequent cycles of $Li_2O_2/TiO_2$ versus MCMB full cell.

Next, please refer to FIG. 10 and FIG. 11. FIG. 10 shows a charging/discharging curve of prelithiation period of $Li_2O_2$/$TiO_2$ versus MCMB full cell. FIG. 11 shows a charging/discharging curve of subsequent cycles of $Li_2O_2$/$TiO_2$ versus MCMB full cell. In the embodiment, a negative electrode is formed with mixing MCMB:super P carbon black:KS graphite:binder=70:7.5:7.5:15 by weight; and a positive electrode is formed with mixing lithium peroxide, a conductive carbon, binder and titanium dioxide by A/C ratio=1 versus weight of MCMB powder with calculation of A/C ratio between $Li_2O_2$/$TiO_2$ cathode and MCMB anode as formulas:

$$Li_2O_2 \text{ vs MCMB}:(372 \text{ mAh/g}*0.5 \text{ g}*0.7)/(410 \text{ mAh/g}*xg)=1$$

$$x=0.4219 \text{ g } Li_2O_2$$

$$TiO_2 \text{ vs MCMB}:(350 \text{ mAh/g}*0.5 \text{ g}*0.7)/(335 \text{ mAh/g}*yg)=1$$

$$y=0.4858 \text{ g } TiO_2$$

According to the formulas based on the electric capacity of MCMB, the weight of each $Li_2O_2$, super P carbon black and KS graphite is 0.4219 g (22%) and the weight of PVDF is 0.1406 g (7%) and the weight of titanium dioxide is 0.4858 g (27%). During charging period of prelithiation, lithium peroxide may be charged to 4.8V against MCMB by applying the current density of 50 $mA/gLi_2O_2$. During discharging period of prelithiation and subsequent charging/discharging, $TiO_2$ may be charged and discharged at 0~3V against MCMB by 0.1 C (1 C=335 mAh/g). The resultant charging/discharging curves of half cells are shown in FIG. 10 and FIG. 11.

Figure 12:
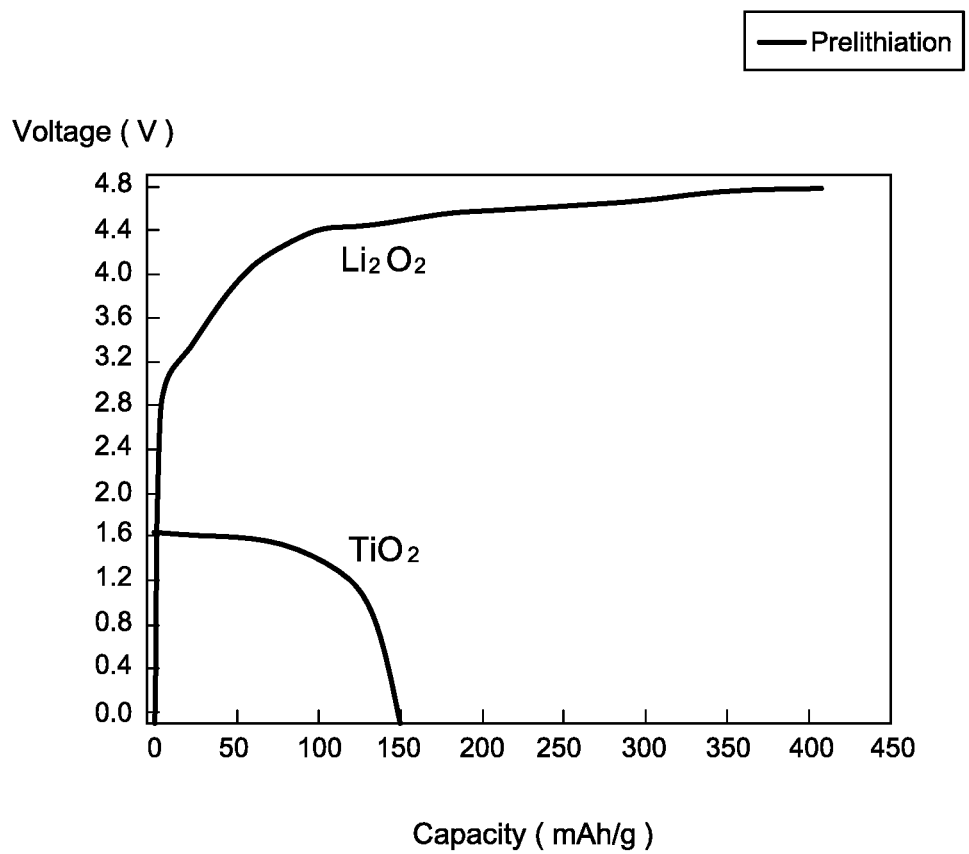
FIG. 12 shows a charge/discharge curve of prelithiation period of $Li_2O_2/TiO_2$ versus MCMB with disassembling process of coin cell.
Figure 13:
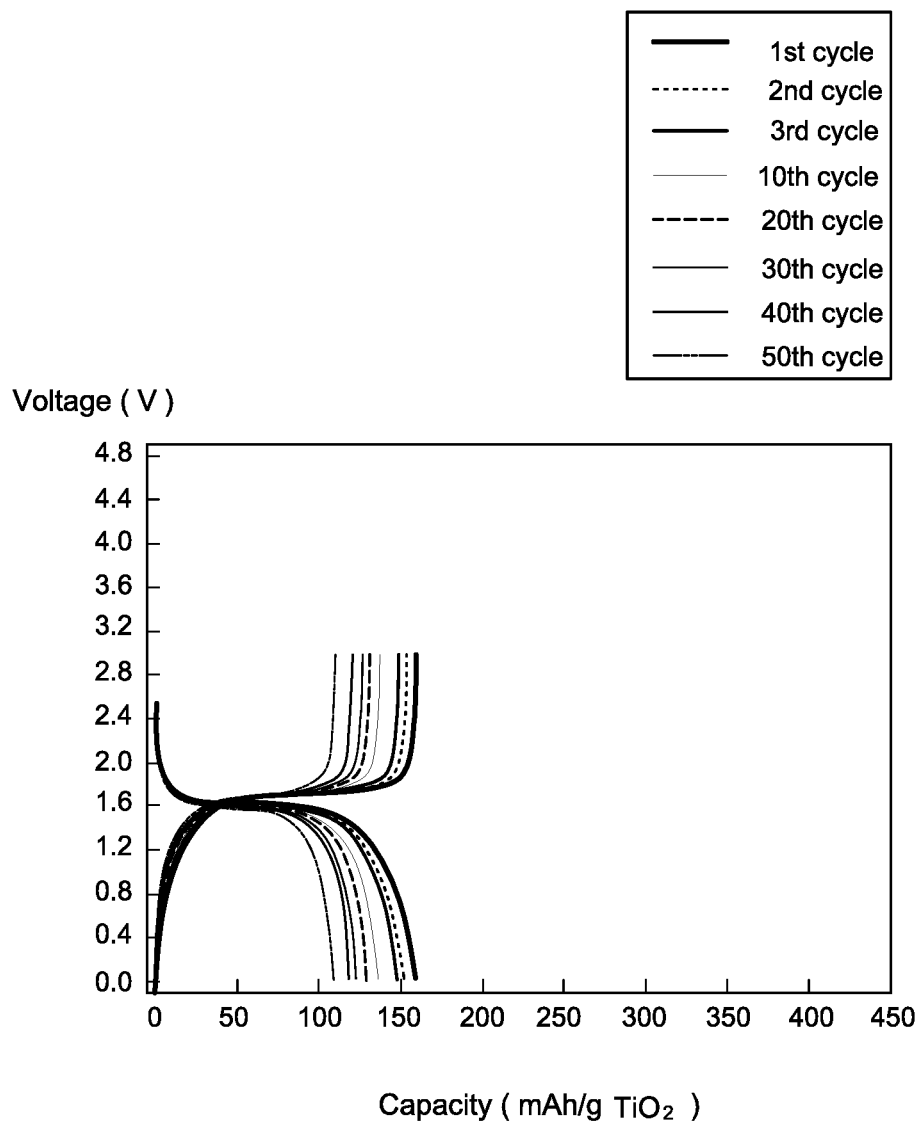
FIG. 13 shows a charge/discharge curve of subsequent cycles of $Li_2O_2/TiO_2$ versus MCMB with disassembling process of coin cell.

It could be found from the above experiments that Li ions prelithiation in the positive is successful. However, oxygen is produced in the process, and will affect the electrochemical performance. It is important to have an oxygen removal step for removing oxygen produced in a first cycle of charge and discharge the lithium ionic energy storage element. In manufacturing a large scale of lithium ionic battery such as battery with aluminum foil soft pack (pouch cell), a battery active step is performed in a first cycle of charging and discharging the lithium ionic battery after filling the electrolyte into the porous separate strip to form a solid electrolyte interphase (SEI) on the negative electrode, and the electrolyte decomposes in part at the same time. Next, the original electrolyte is withdrawn by evacuation, and a new electrolyte is filled. Accordingly, a regular charging and discharging the lithium ionic battery can be performed. FIG. 12 shows a charge/discharge curve of prelithiation period of $Li_2O_2/TiO_2$ versus MCMB with disassembling process of coin cell, and FIG. 13 shows a charge/discharge curve of subsequent cycles of $Li_2O_2/TiO_2$ versus MCMB with disassembling process of coin cell. The effect of removing oxygen is not obvious from FIG. 12. However, there is not an acute decease in electric capacity during the subsequent charge/discharge of $TiO_2$ that can prove the subsequent charge/discharge of $TiO_2$ is affected by the side reaction of the prelithiation discharging period. The source of the side reaction is the oxygen produced from the decomposition of lithium peroxide during the prelithiation charging period.

Figure 14:
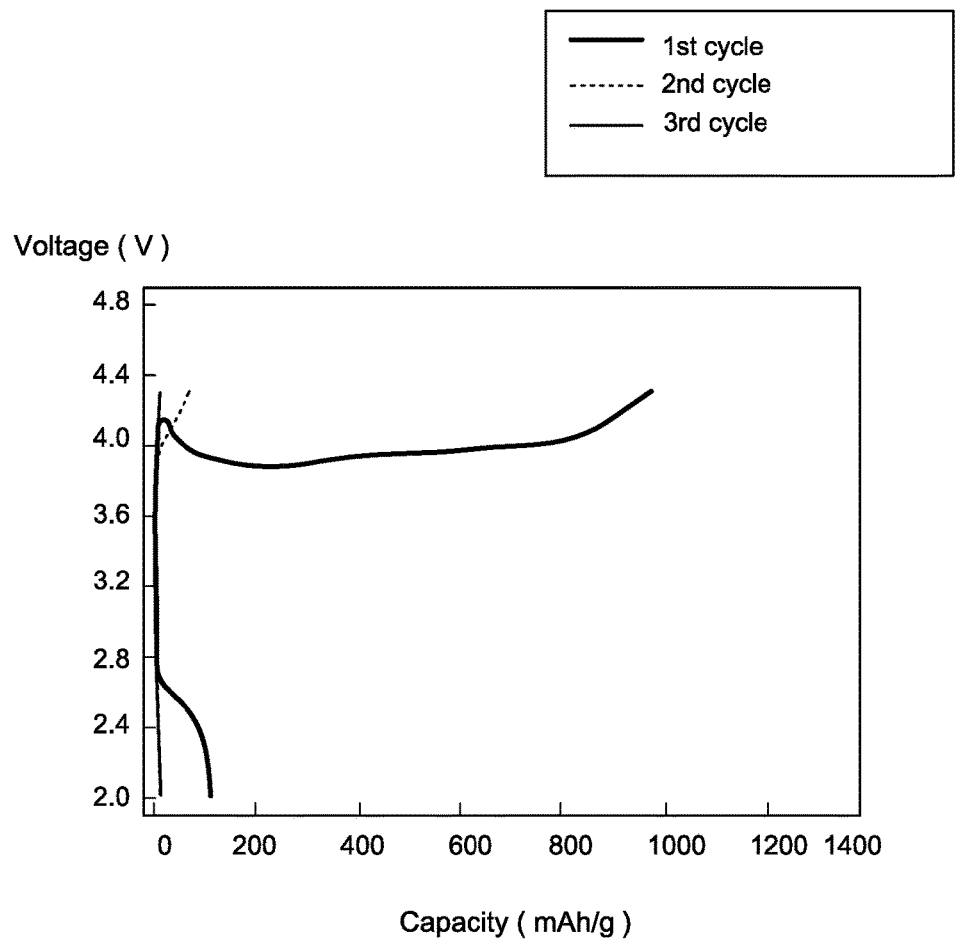
FIG. 14 shows a charging/discharging curve of $Li_2O_2$ (30 wt. %) with current density of 100 mA/g $Li_2O_2$ vs. Li metal of half cell.

In another embodiment, carbon-sulfur composite may be used for the positive electrode frame active substance of the positive electrode active substance. Lithium peroxide is mixed with carbon-sulfur composite to replace Li metal. A full cell is assembled by the positive electrode having the positive electrode active substance including lithium peroxide and carbon-sulfur composite and the negative electrode having the negative electrode active substance including hard carbon. Before assembling a full cell, the electrochemical properties of lithium peroxide and carbon-sulfur composite in ethers should be determined. Because Li-sulfur battery uses ethers as an electrolyte, a half cell that is used for test is formed by assembling a positive electrode formed with mixing lithium peroxide, a conductive carbon and binder by weight ratio of 30:60:10; and a porous separate strip filled with an electrolyte, e.g. a concentration of 1M lithium bis(trifluoromethanesulfonly)imide dissolving in a mixing solution of tetraethylene glycol dimethyl ether (TEGDME) and 1,3-dioxolane (DOL) with mixing ratio 1:1 by volume. Conditions of operation include charging/discharging current density of 100 mA/g $Li_2O_2$ vs. Li metal and charging/discharging voltage of 2-4.3V in the embodiment, shown as FIG. 14. The cut off voltage of charging is 4.3V. The half cell is charged for 9 hours by 100 mA/g$Li_2O_2$ after testing. It can be found the decomposition of lithium peroxide in Li-sulfur battery electrolyte system has the overpotential about 4.1V and the resultant electric capacity about 980 mAh/g$Li_2O_2$.

Figure 15:
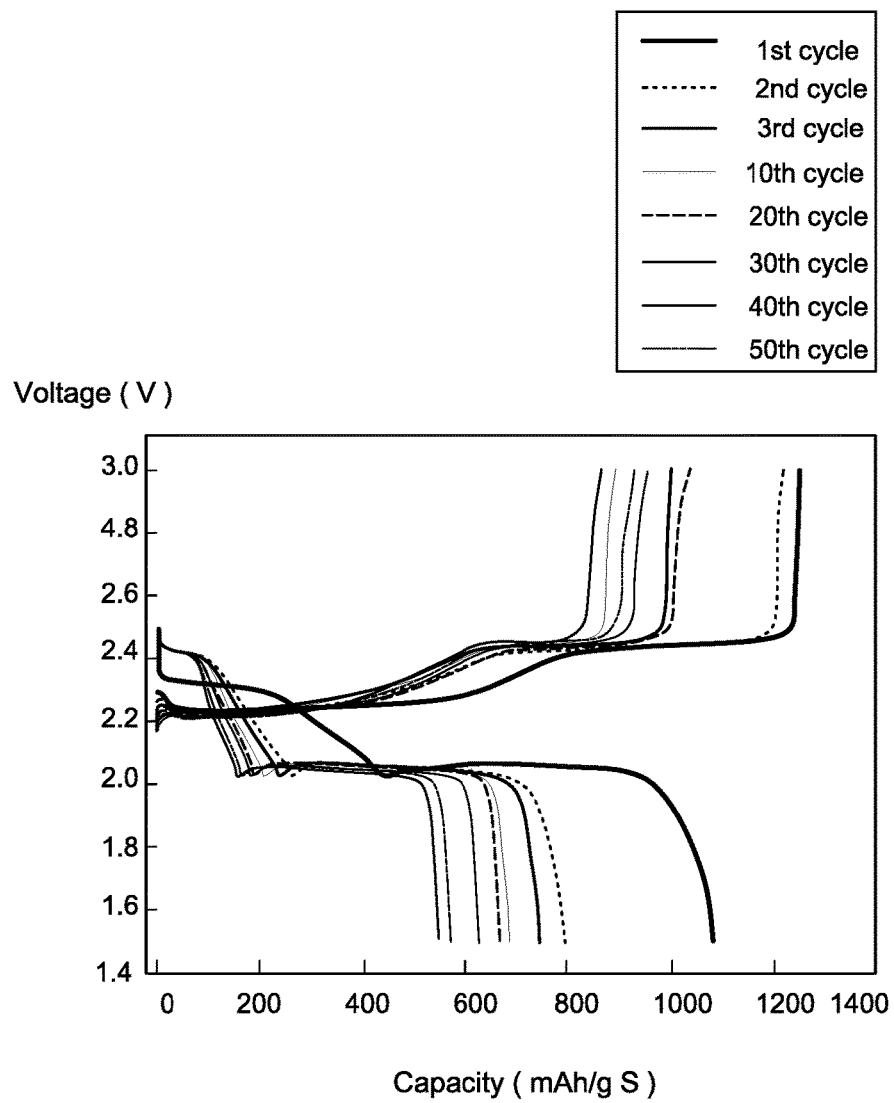
FIG. 15 shows a charge/discharge curve of carbon-sulfur composite of half cell.

FIG. 15 shows a charge/discharge curve of carbon-sulfur composite of half cell. The carbon-sulfur composite of the half cell has a weight ratio of carbon with sulfur is 0.4-1. Conditions of operation include charging/discharging current density of 0.1 C (1 C=1672 mAh/gs) vs. $Li/Li^+$ and charging/discharging voltage of 1.5V-3V in the embodiment, shown as FIG. 15.

Figure 16:
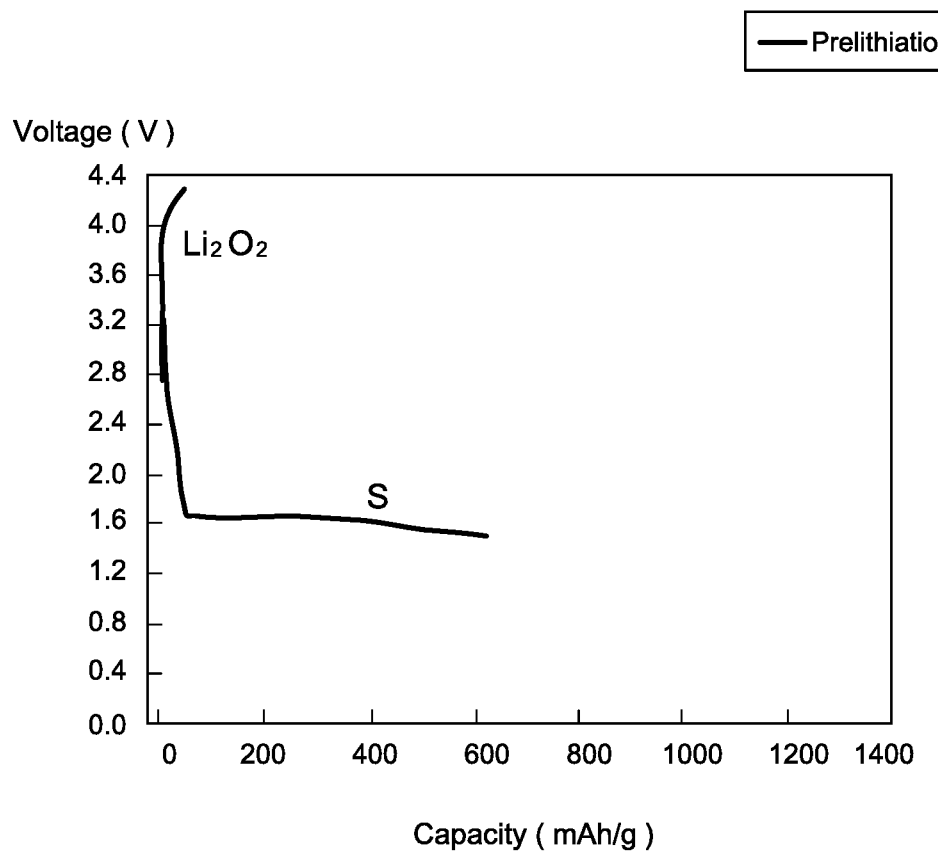
FIG. 16 shows a charge/discharge curve of prelithiation period of lithium peroxide/carbon-sulfur composite vs. $Li/Li^+$ of half cell.

FIG. 16 shows a charge/discharge curve of prelithiation period of lithium peroxide/carbon-sulfur composite vs. $Li/Li^+$ of half cell. In the embodiment, a half cell that is used for test is formed by assembling a positive electrode formed with mixing lithium peroxide/carbon-sulfur composite, a conductive carbon and a binder dissolving in a dispersant of N-methyl-2-pyrrolidone; and a porous separate strip filled with an electrolyte, e.g. a concentration of 1M lithium bis(trifluoromethanesulfonly)imide dissolving in a mixing solution of tetraethylene glycol dimethyl ether (TEGDME) and 1,3-dioxolane (DOL) with mixing ratio 1:1 by volume. During charging period of prelithiation, lithium peroxide may be charged with current density of 100 mA/g$Li_2O_2$ to 4.3V against $Li/Li^+$ by applying the current density of 50 mA/g$Li_2O_2$. During discharging period of prelithiation and subsequent charging/discharging, carbon-sulfur composite may be charged and discharged against $Li/Li^+$ by 0.1 C (1 C=1672 mAh/gs). The resultant charging/discharging curves of half cells are shown in FIG. 16.

The lithium ionic energy storage element of the present disclosure includes a lithium ion donor having lithium peroxide and/or lithium oxide and a positive electrode frame active substance, wherein lithium peroxide and/or lithium oxide can be decomposed to produce lithium ions by electrochemical charging, and lithium ions intercalate repeatedly in and out of the positive electrode frame active substance and the negative electrode active substance in a full cell. The full cell can exhibit a high capacity. The positive electrode frame active substance of the positive electrode active substance can be a material selected from the group consisting of anatase titanium dioxide, carbon-sulfur composite, carbon-containing materials and carbon fluoride, but not limited to the above groups, as long as the materials that are stable and have excellent electric capacity are suitable as the positive electrode frame active substance. Even lithium metallic oxides may be the positive electrode frame active substance to mix with lithium peroxide and/or lithium oxide as the positive electrode active substance that can exhibit a higher capacity than the full cell using lithium metallic oxides only as the positive electrode active substance.

The present disclosure is not limited to these embodiments, but various variations and modifications may be made without departing from the scope of the present disclosure.

What is claimed is:

1. A method for making a lithium ionic energy storage element, the method comprising steps of:
   (a) mixing a lithium ion donor, a positive electrode frame active substance and a binder with a predetermined weight ratio to form a mixture, and adding the mixture into a dispersant to form a positive electrode active substance, wherein the lithium ion donor includes lithium peroxide, lithium oxide or a combination thereof;
   (b) coating the positive electrode active substance on an aluminum foil to form a film, and baking the film to form a positive electrode;
   (c) forming a lithium ionic energy storage element by assembling the positive electrode, a negative electrode having a negative electrode active substance and a porous separate strip interposed between the positive electrode and the negative electrode, and filling an electrolyte into the porous separate strip;
   (d) performing a battery active step in a first cycle of charging and discharging the lithium ionic energy storage element, and withdrawing the electrolyte by evacuation, and then refilling a new electrolyte at the battery activity step; and
   (e) after the first cycle of charging and discharging the lithium ionic energy storage element, performing a regular charging and discharging on the lithium ionic energy storage element.

2. The method as claimed in claim 1, wherein the positive electrode frame active substance of the step (a) is a material selected from the group consisting of anatase titanium dioxide, carbon-sulfur composite, carbon-containing materials and carbon fluoride.

3. The method as claimed in claim 1, wherein the positive electrode frame active substance of the step (a) is lithium metallic oxides.

4. The method as claimed in claim 1, wherein the carbon-sulfur composite of the positive electrode frame active substance has a weight ratio of carbon with sulfur is 0.4-1.

5. The method as claimed in claim 1, further comprising adding a conductive carbon into the mixture of the step (a) to forming the positive electrode active substance.

6. The method as claimed in claim 1, wherein the binder in the step (a) is polyvinylidene fluoride or carboxymethyl cellulose.

7. The method as claimed in claim 1, wherein the negative electrode active substance of the step (c) is a material selected from the group consisting of graphitized mesocarbon microbeads, hard carbon, Si alloy and Sn alloy.

8. The method as claimed in claim 1, wherein the electrolyte of the step (c) is a concentration of 1M $LiPF_6$ dissolving in a mixing solution of ethylene carbonate and diethyl carbonate; or a concentration of 1M lithium bis(trifluoromethanesulfonyl)imide dissolving in a mixing solution of tetraethylene glycol dimethyl ether and 1,3-dioxolane.

9. The method as claimed in claim 1, wherein the dispersant of the step (a) is N-methyl-2-pyrrolidone.

\* \* \* \* \*